(12) United States Patent
Dugan

(10) Patent No.: US 10,196,154 B2
(45) Date of Patent: *Feb. 5, 2019

(54) METHODS AND APPARATUS FOR REDUCING ANXIETY DURING TRAVEL

(71) Applicant: Brian M. Dugan, Sleepy Hollow, NY (US)

(72) Inventor: Brian M. Dugan, Sleepy Hollow, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/653,521

(22) Filed: Jul. 18, 2017

(65) Prior Publication Data

US 2017/0313440 A1 Nov. 2, 2017

Related U.S. Application Data

(63) Continuation of application No. 14/056,900, filed on Oct. 17, 2013, now Pat. No. 9,738,400.

(60) Provisional application No. 61/715,245, filed on Oct. 17, 2012.

(51) Int. Cl.
*B64D 47/02* (2006.01)
*G07C 5/08* (2006.01)
*B64D 11/00* (2006.01)

(52) U.S. Cl.
CPC ........... *B64D 47/02* (2013.01); *G07C 5/0825* (2013.01); *B64D 11/0015* (2013.01)

(58) Field of Classification Search
CPC .................................................. B64D 47/02
USPC ....................................................... 434/428
See application file for complete search history.

(56) References Cited

U.S. PATENT DOCUMENTS

| | | | |
|---|---|---|---|
| 4,229,725 A * | 10/1980 | Reilly | G01P 5/17 244/182 |
| 5,353,022 A | 10/1994 | Middleton | |
| 5,807,114 A * | 9/1998 | Hodges | A61M 21/00 434/219 |
| 5,815,407 A | 9/1998 | Huffman et al. | |
| 6,012,926 A * | 1/2000 | Hodges | A61M 21/00 434/236 |
| 6,429,773 B1 | 8/2002 | Schuyler | |
| 6,701,234 B1 | 3/2004 | Vogelsang | |
| 8,374,888 B2 | 2/2013 | Earles et al. | |
| 2003/0149344 A1 | 8/2003 | Nizan | |
| 2004/0183699 A1 | 9/2004 | Vialleton | |
| 2005/0148828 A1 | 7/2005 | Lindsay | |
| 2005/0254712 A1 | 11/2005 | Lindeman | |

(Continued)

FOREIGN PATENT DOCUMENTS

KR   10-2006-0069140   6/2006

OTHER PUBLICATIONS

McGee, "New Strategies for Fear of Flying," www.usatoday.com Travel, Columns & Blogs, Aug. 5, 2009.

(Continued)

*Primary Examiner* — Thomas Hong
(74) *Attorney, Agent, or Firm* — Dugan & Dugan, PC

(57) ABSTRACT

In some embodiments, a system is provided that includes a portable electronic device; and an application executable on the portable electronic device, the application including computer program code that (a) monitors acceleration data during a flight of an airplane; and (b) displays a representation of the acceleration data in relation to a threshold acceleration of the airplane. Numerous other aspects are provided.

18 Claims, 8 Drawing Sheets

(56) References Cited

U.S. PATENT DOCUMENTS

| | | |
|---|---|---|
| 2005/0277872 A1 | 12/2005 | Colby et al. |
| 2007/0042765 A1 | 2/2007 | Bailin et al. |
| 2010/0030401 A1 | 2/2010 | Rogers |
| 2010/0157061 A1 | 6/2010 | Katsman et al. |
| 2010/0315265 A1* | 12/2010 | Smith .................... G01W 1/00 340/963 |
| 2011/0009107 A1 | 1/2011 | Guba et al. |
| 2011/0047112 A1 | 2/2011 | Ketabdar et al. |
| 2012/0029764 A1 | 2/2012 | Payne et al. |
| 2012/0140070 A1 | 6/2012 | De Mers |
| 2012/0203081 A1 | 8/2012 | LeBoeuf et al. |
| 2012/0214140 A1 | 8/2012 | Brynelsen et al. |
| 2014/0106333 A1 | 4/2014 | Dugan |

OTHER PUBLICATIONS

International Search Report and Written Opinion of International Patent Application No. PCT/US13/65545 dated Feb. 12, 2014.

International Preliminary Report on Patentability of International Patent Application No. PCT/US13/65545 dated Apr. 30, 2015.

Non-Final Office Action of U.S. Appl. No. 14/056,900 dated Jul. 7, 2015.

Jan. 7, 2016 Reply to Jul. 7, 2015 Non-Final Office Action of U.S. Appl. No. 14/056,900.

Final Office Action of U.S. Appl. No. 14/056,900 dated Feb. 2, 2016.

Amendment Submitted with RCE of U.S. Appl. No. 14/056,900, filed Dec. 2, 2016.

Aircraft G Meter Android App (updated Feb. 21, 2013).

SOAR iPhone App, G-FORCE screen (Version 1.0 posted Aug. 20, 2013).

Tom Bunn, "Dealing With Turbulence When Flying," www.examiner.com/article/dealing-with-turbulence-when-flying (May 17, 2013).

Notice of Allowance of U.S. Appl. No. 14/056,900 dated Apr. 17, 2017.

Comments on Statement of Reason of Allowance of U.S. Appl. No. 14/056,900, filed Jul. 17, 2017.

\* cited by examiner

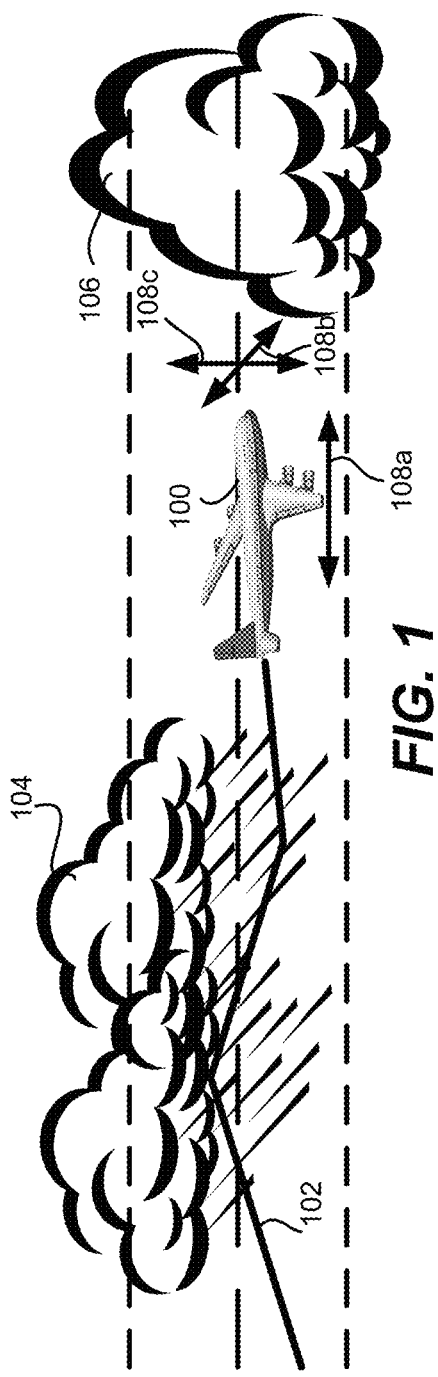
FIG. 1
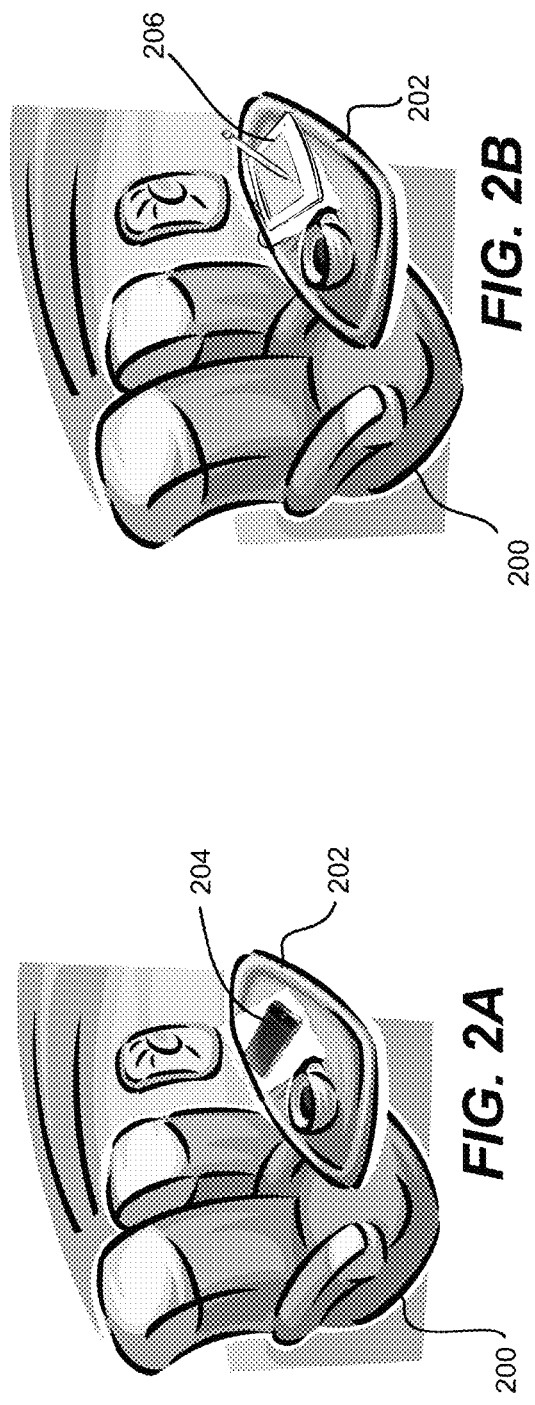
FIG. 2A
FIG. 2B

METHODS AND APPARATUS FOR REDUCING ANXIETY DURING TRAVEL

RELATED APPLICATIONS

This application is a continuation of and claims priority to U.S. patent application Ser. No. 14/056,900 filed Oct. 17, 2013, and titled "METHODS AND APPARATUS FOR REDUCING ANXIETY DURING TRAVEL", which claims priority to U.S. Provisional Patent Application No. 61/715, 245, filed on Oct. 17, 2012, and entitled "METHODS AND APPARATUS FOR REDUCING FLIGHT ANXIETY". Each of these applications is hereby incorporated by reference herein in its entirety for all purposes.

FIELD

The present invention relates to reducing anxiety, and more particularly to methods and apparatus for reducing anxiety during travel.

BACKGROUND

Flying on an airplane may cause mild to moderate anxiety for many passengers, and severe anxiety for some passengers. By some estimates, up to 15% of the population is afraid to fly on an airplane. See, for example, McGee, "New Strategies for Fear of Flying," www.USATODAY.com Travel, Columns & Blogs, Aug. 5, 2009.

Numerous counseling programs have been developed to help people overcome their fear of flying. Most involve educating people about the mechanics of flight, teaching breathing techniques, and/or psychological counseling. Such programs typically are costly, and may not provide active comfort during a flight.

SUMMARY

In some embodiments, a system is provided that includes a portable electronic device; and an application executable on the portable electronic device, the application including computer program code that (a) monitors acceleration data during a flight of an airplane; and (b) displays a representation of the acceleration data in relation to a threshold acceleration of the airplane.

In some embodiments, an apparatus is provided that includes a portable electronic device including one or more accelerometers and a display. The portable electronic device is operative to determine instantaneous magnitudes of acceleration experienced over time by an aircraft carrying the portable electronic device based on measurements of the accelerometers during a flight of the aircraft, and the portable electronic device is further operative to display a representation of the magnitudes of acceleration over time as acceleration data in relation to a threshold acceleration tolerance level of the aircraft.

In some embodiments a method of reducing anxiety during a flight is provided that includes (1) providing a portable electronic device having an application executable on the portable device, the application including computer program code that monitors acceleration data during a flight of an airplane and displays a representation of the acceleration data in relation to a threshold acceleration of the airplane; and (2) employing the portable electronic device during a flight on an airplane to monitor acceleration data during the flight of the airplane and display a representation of the acceleration data in relation to a threshold acceleration of the airplane.

Numerous other aspects are provided. Other features and aspects of the present invention will become more fully apparent from the following detailed description, the appended claims and the accompanying drawings.

DRAWINGS

FIG. 1 depicts an example representation of acceleration force information experienced by an aircraft according to embodiments of the present invention.

FIGS. 2A & 2B depict examples of devices being used to sense and display acceleration force information according to embodiments of the present invention.

DETAILED DESCRIPTION

Figure 3A:
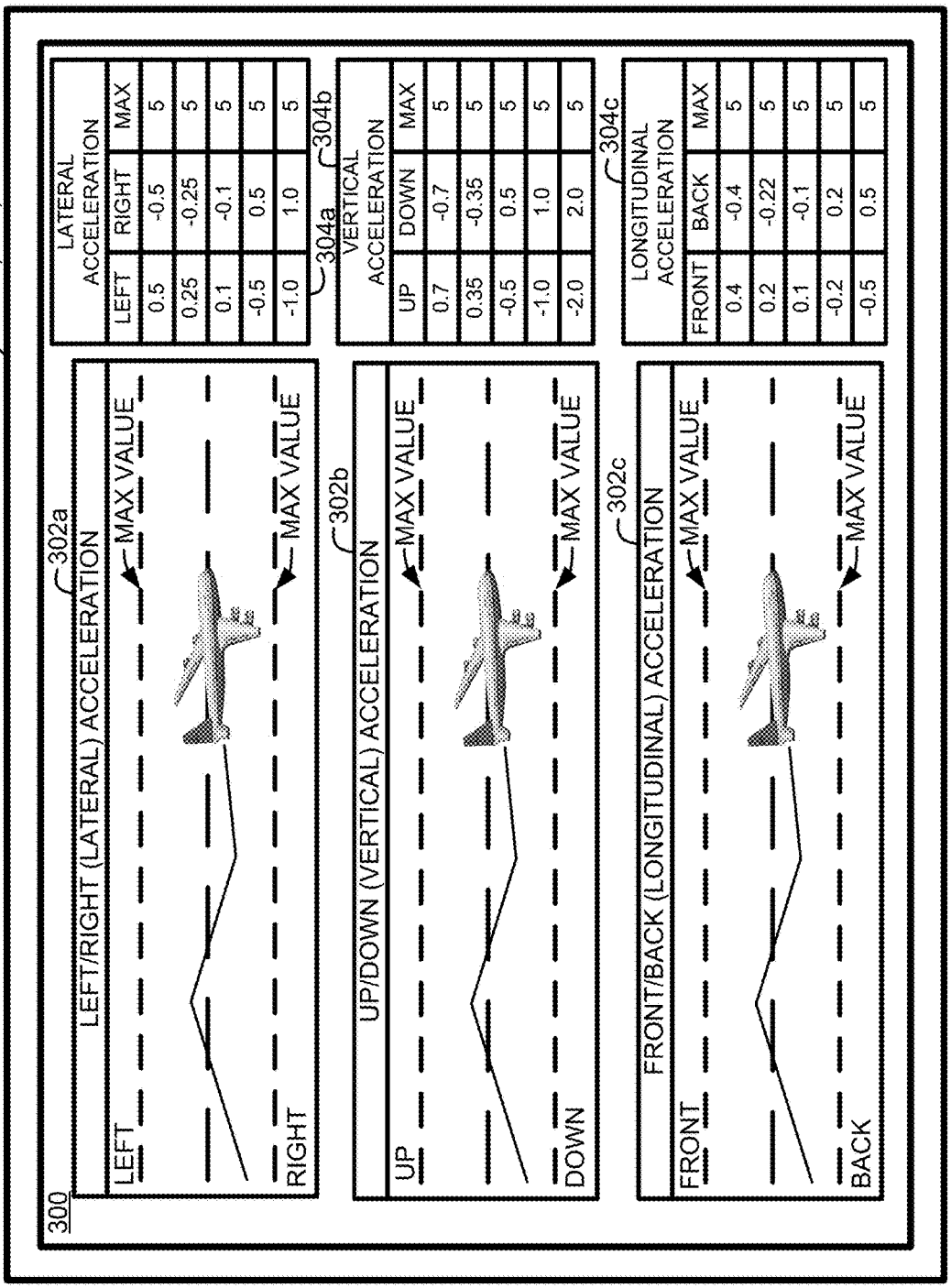
FIGS. 3A & 3B depict example displays of example representations of acceleration force information experienced by an aircraft according to embodiments of the present invention.

Embodiments of the present invention provide methods and apparatus for reducing anxiety related to traveling in aircraft or other vehicles. In one or more embodiments, acceleration data regarding a plane is collected during a flight and displayed to a passenger. The acceleration data represents acceleration force information over time experienced by an aircraft (or other vehicle) along a vertical direction, a longitudinal direction, a lateral direction, and/or a composite of two or more directions, for example.

According to embodiments of the present invention, acceleration data may be measured by a standalone acceleration module with a three axis accelerometer, for example, or by employing the accelerometers available in a cellular telephone, smart wristwatch, tablet computer, portable video game player or the like. In some embodiments, the acceleration data may be displayed along with the maximum safe (or other threshold) acceleration values for the vehicle on which the passenger is traveling. Measured acceleration data typically will be significantly smaller in magnitude than the maximum acceleration values tolerable by the vehicle, e.g., an aircraft. As such, a graphic representation that provides a visualization of real-time, measured acceleration during travel may be comforting to a passenger as the passenger will observe that despite being unpleasant, even abrupt movements of a vehicle, e.g., due to turbulence, do not typically place significant stress on the vehicle.

Throughout the following description, embodiments of the present invention will be described with respect to flight travel in an aircraft to provide clear examples. However, it will be understood that the present invention may be embodied in and applicable to many forms of travel including travel in trains, boats, submarines, spacecraft, automobiles, motorcycles, bicycles, horses, and the like.

In one or more embodiments, flight information, calming messages, advice, maps, and/or other content, may be selected, displayed and/or played for a passenger based on measured acceleration data. For example, as turbulence increases, measured acceleration values may increase in value and content provided to a passenger may be tailored based on the magnitude of the measured acceleration. In general, content may be selected based on magnitude of the acceleration or rate of change of the acceleration, after a predetermined number of threshold acceleration values have been reached and/or crossed, or based on any other suitable parameter(s).

In some embodiments, biometric information about a passenger during a flight may be measured in addition to, or instead of, acceleration data. For example, a cellular telephone, tablet computer, smart wristwatch, wearable sensor, portable video game player or the like may be employed to monitor biometric data such as heart rate, pulse rate, brain activity, skin resistivity, breathing rate, or the like, during a flight. Such information, alone or in combination with measured acceleration data, may be employed to affect, select, or determine content provided to a passenger during a flight.

These and other embodiments are described below with reference to FIGS. 1-8.

FIG. 1 is a schematic view of an airplane 100 during flight. Airplane 100 is shown traveling along a flight path 102 through storm clouds 104 and other clouds 106. Typically airplane 100 flies along a primarily straight path for the majority of its flight.

As airplane 100 is flying, it may experience turbulence. Turbulence may be caused by many factors such as the presence of storm clouds 102 and associated updrafts and/or downdrafts, other cloud types 104, strong winds, surface features such as mountains, clear air turbulence, or the like. Turbulence may cause an airplane to shake, bounce up and down or side to side, drop unexpectedly, or otherwise move unexpectedly, abruptly, or in a manner that causes many passengers concern (as indicated by arrows 108a-c). One concern passengers may have is that the turbulence may damage the aircraft or otherwise create an unsafe flying condition.

FIGS. 2A-2B illustrate a passenger seat 200 on an aircraft. During flight, a passenger (not shown) may employ a tray 202 for eating, drinking, working or the like. As shown in FIG. 2A, a cellular telephone 204 is positioned on the tray 202; while in FIG. 2B, a tablet computer 206 is positioned on the tray 202.

In accordance with embodiments of the present invention, and as described further below, cellular telephone 204 and/or tablet computer 206 (and/or any other suitable portable electronic device such as a smart wristwatch) may include computer program code and/or one or more computer program products that may monitor acceleration of the airplane 100 along one or more directions/axes. For instance, most smartphones and tablet computers employ accelerometers and/or similar devices to detect position and/or change in position of the devices, and use this information for orienting images on a display. Such accelerometers may also be employed to provide acceleration values along one, two, three or more directions. In addition, the accelerometers may be used to determine a total magnitude or composite of acceleration experienced in all directions. In some embodiments, an external device such as a wearable sensor (e.g., a smart wrist watch, a wrist band with accelerometers, etc.), may measure acceleration information and provide the acceleration information to a portable electronic device such as the cellular telephone 204 or tablet computer 206.

In some embodiments, the acceleration information may be correlated with time and location (e.g., geographic position, altitude, etc.) which may also be determined by the electronic device or received from any other data source (e.g., input from a user, a signal from a plane, a radio broadcast, GPS satellites, a real time clock signal, another user's electronic device, etc.).

FIG. 3A is an example display/interface 300 that may be displayed on cellular telephone 204, tablet 206, smart wristwatch, or a similar portable electronic device. The display/interface 300 may be embodied, for example, as computer program code within a memory (not shown) of a portable electronic device.

With reference to FIG. 3A, the display/interface 300 includes plots 302a-c of acceleration data measured along lateral, vertical and longitudinal axes, respectively, of plane 100 during a flight of plane 100 along its flight path. For example, cellular telephone 204, tablet 206 or a similar portable electronic device may be placed on tray 202, or held by a passenger, and used to monitor and/or collect acceleration data along one or more axis during flight. The acceleration data, or a representation thereof, may be plotted along each respective axis as shown. In some embodiments, acceleration data may be displayed in terms of G force.

Figure 3B:
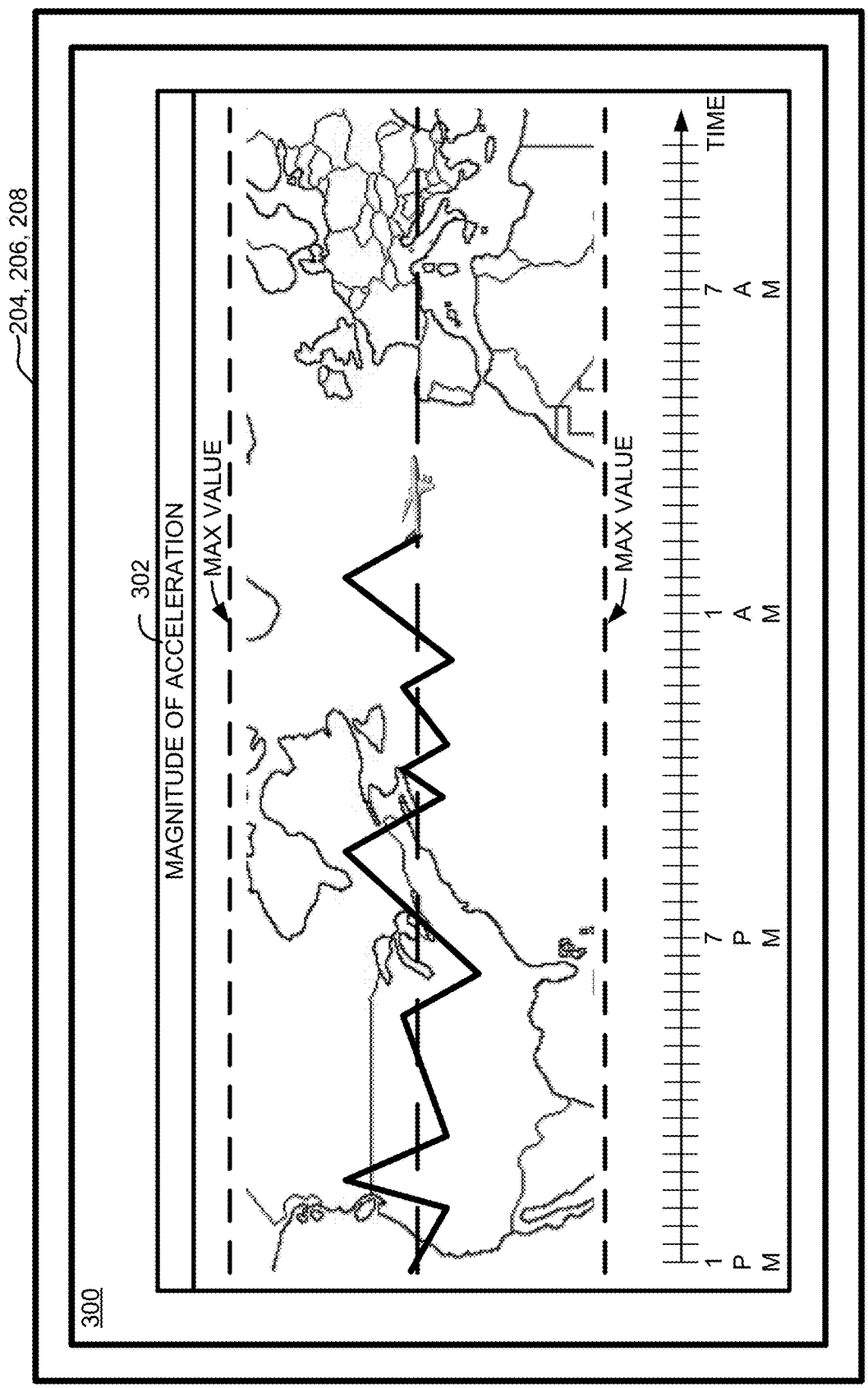

Also displayed on each plot are maximum values for acceleration along each axis. These may be based on, for example, the maximum tolerable or otherwise relevant acceleration numbers for the plane 100 (e.g., values that should not be exceeded by the plane 100). Real time acceleration data may be displayed for each axis, such as in tables 304a-c, respectively. The graphics, plots and/or data shown in FIGS. 3A-3B are merely representative. Other graphics, plots and/or data may be displayed.

With reference to FIG. 3B, the display/interface 300 includes a plot 302 of acceleration magnitude data measured as a composite of lateral, vertical and longitudinal forces experienced by plane 100 during a flight along a flight path. For example, cellular telephone 204, tablet 206, a smart wristwatch, or a similar portable electronic device may be placed on tray 202, or held/worn by a passenger, and used to monitor and/or collect acceleration data during a flight. The acceleration data, or a representation thereof, may be plotted along the flight path as shown. The plot 302 may be overlaid on a geographic map or other representation of location that correlates turbulence events with location. Likewise, as shown in FIG. 3B, a timescale may be included that allows turbulence events to be correlated with time.

Example methods provided in accordance with embodiments of the present invention are described below with reference to FIGS. 4-7. These and other methods in accordance with the present invention may be implemented in hardware, software and/or a combination of the same. In some embodiments, computer program code may be provided on a cellular telephone, tablet computer, laptop computer, portable video game player or similar device for implementing one or more of the methods described herein. In some embodiments, monitored acceleration and/or biometric data may be collected and transmitted to a remote computer such as a web server from one or more portable devices.

Figure 4:
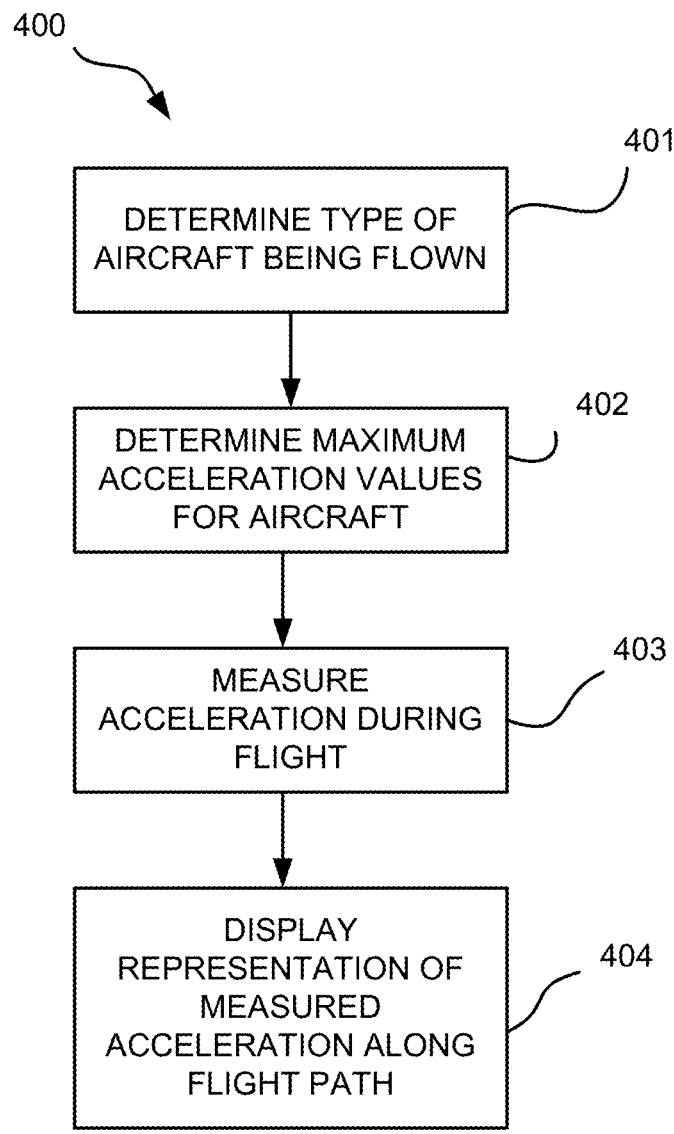
FIGS. 4 through 7 are flowcharts that depict example methods according to embodiments of the present invention.

FIG. 4 is a flow chart of an example method 400 provided in accordance with the present invention. The method 400 begins in Block 401 in which the type of aircraft being flown is determined (e.g., Boeing 747-787, Airbus 319-380, etc.). For example, a passenger may select an airplane type from a list of aircraft displayed via an application executing on cellular telephone 204, tablet 206, or the like. Based on the aircraft type, in Block 402, maximum, tolerable or otherwise relevant threshold acceleration values may be determined for the selected aircraft (e.g., such as a threshold acceleration tolerance level that may cause concern for a passenger or be otherwise significant). In some embodiments, a database or lookup table of aircraft and corresponding maximum (or otherwise relevant) lateral, vertical and/or longitudinal acceleration values may be developed and stored in the cellular telephone 204, tablet 206, etc.

In Block 403, acceleration data is measured during flight. For example, an application executing on the cellular telephone 204, tablet 206 or other suitable portable electronic device, may direct the passenger to place the portable electronic device in a particular orientation (e.g., with a top facing the front of the plane, by displaying an arrow on the portable electronic device and directing the passenger to ensure the arrow points toward the front of the plane, etc.). The portable electronic device then may measure acceleration along lateral, vertical and/or longitudinal directions during the flight (e.g., using one or more accelerometers within the portable electronic device or an external accelerometer in communication with the portable device). In some embodiments, the portable electronic device may determine its orientation automatically (e.g., based on GPS data/position change during a flight, for example). In Block 404, a representation of measured acceleration along the flight path is displayed. For instance, a plot, table or other representation of acceleration data may be displayed, such as shown in FIGS. 3A-B. An auditory readout also may be employed.

Figure 5:
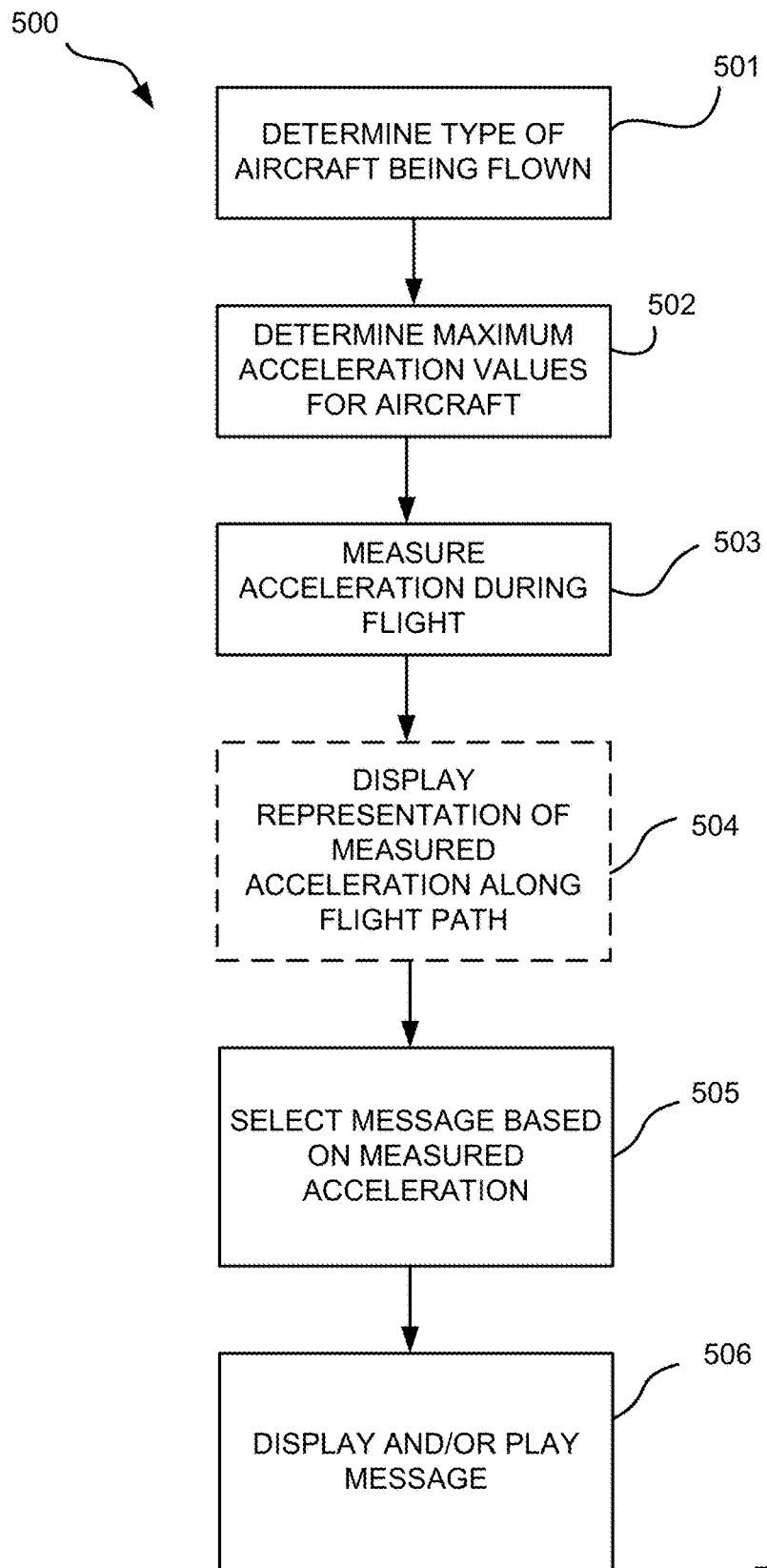

FIG. 5 is a flow chart of an example method 500 provided in accordance with the present invention. Blocks 501-503 are similar to Blocks 401-403 of method 400 of FIG. 4. For example, a passenger may select a type of aircraft being flown, maximum/tolerable/threshold acceleration values for the aircraft may be determined, and acceleration data may be measured during the flight. In Block 504, information regarding measured acceleration may or may not be provided to the passenger.

In Block 505, a message, graphics and/or other information to provide to a passenger is determined based on the measured acceleration data; and the message, graphics and/or other information/content is provided to the passenger in Block 506. For example, if the acceleration data indicates that the flight is smooth, music, flight information, entertainment, etc., may be provided to the passenger. If acceleration data indicates that the flight is getting bumpy, calming messages may be displayed, breathing techniques may be suggested, or the like (e.g., content may be adjusted based on measured acceleration).

Figure 6:
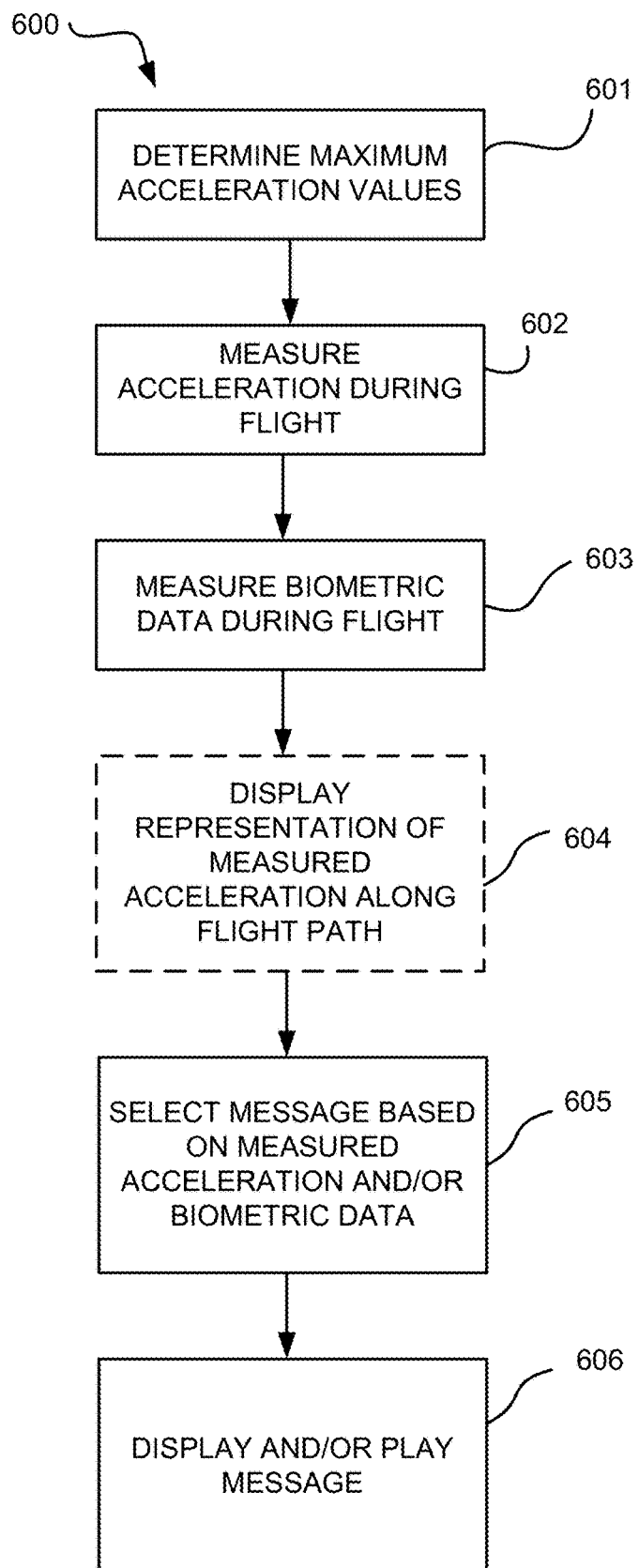

FIG. 6 is a flow chart of an example method 600 provided in accordance with the present invention. The method 600 begins in Block 601 in which maximum, tolerable or otherwise relevant threshold acceleration values may be determined for the aircraft being flown. In some embodiments, a database or lookup table of aircraft and corresponding maximum (or otherwise relevant) lateral, vertical and/or longitudinal acceleration values may be developed and stored in the cellular telephone 204, tablet 206, etc.

In Block 602, acceleration data is measured during flight. For example, an application executing on the cellular telephone 204, tablet 206 or other suitable portable electronic device, may monitor and/or collect acceleration data measured by the portable electronic device or an external device. In some embodiments, the portable electronic device may direct the passenger to place the portable electronic device in a particular orientation, and acceleration data may be monitored and/or collected.

In Block 603, biometric information is determined for the passenger during the flight. For example, a heart rate monitor such as a chest strap or wrist band may be employed to measure heart rate and provide heart rate information to the cellular telephone 204, tablet 206, a portable video game player, a laptop computer or the like. Other biometric measurement devices may be employed to measure and/or provide biometric information to the cellular telephone 204, tablet 206, or other portable electronic device, such as pulse rate, brain activity, skin resistivity, breathing rate, etc.

In Block 604, if desired, a representation of measured acceleration along the flight path may be displayed. For instance, a plot, table or other representation of acceleration data may be displayed, such as shown in FIGS. 3A-3B. An auditory readout also may be employed. Biometric information may be displayed if desired.

In Block 605, a message, graphics and/or other information to provide to a passenger is determined based on the measured acceleration and/or biometric data; and the message, graphics and/or other information is provided to the passenger in Block 606. For example, if the acceleration data and/or biometric data indicates that the flight is smooth, music, flight information, entertainment, and/or other content, may be provided to the passenger. If acceleration data indicates that the flight is getting bumpy, calming messages and/or other relevant information/content may be displayed, breathing techniques may be suggested, or the like. The effects of the displayed information may be directly measured based on monitored biometric data, and content may be adjusted if needed. In some embodiments, the biometric data may be monitored by the portable electronic device to determine if the passenger is asleep (e.g., by monitoring heart rate, breathing rate, sleep cycles, etc.), and content and/or lack of content may be determined based on the biometric data and/or acceleration data.

Figure 7:
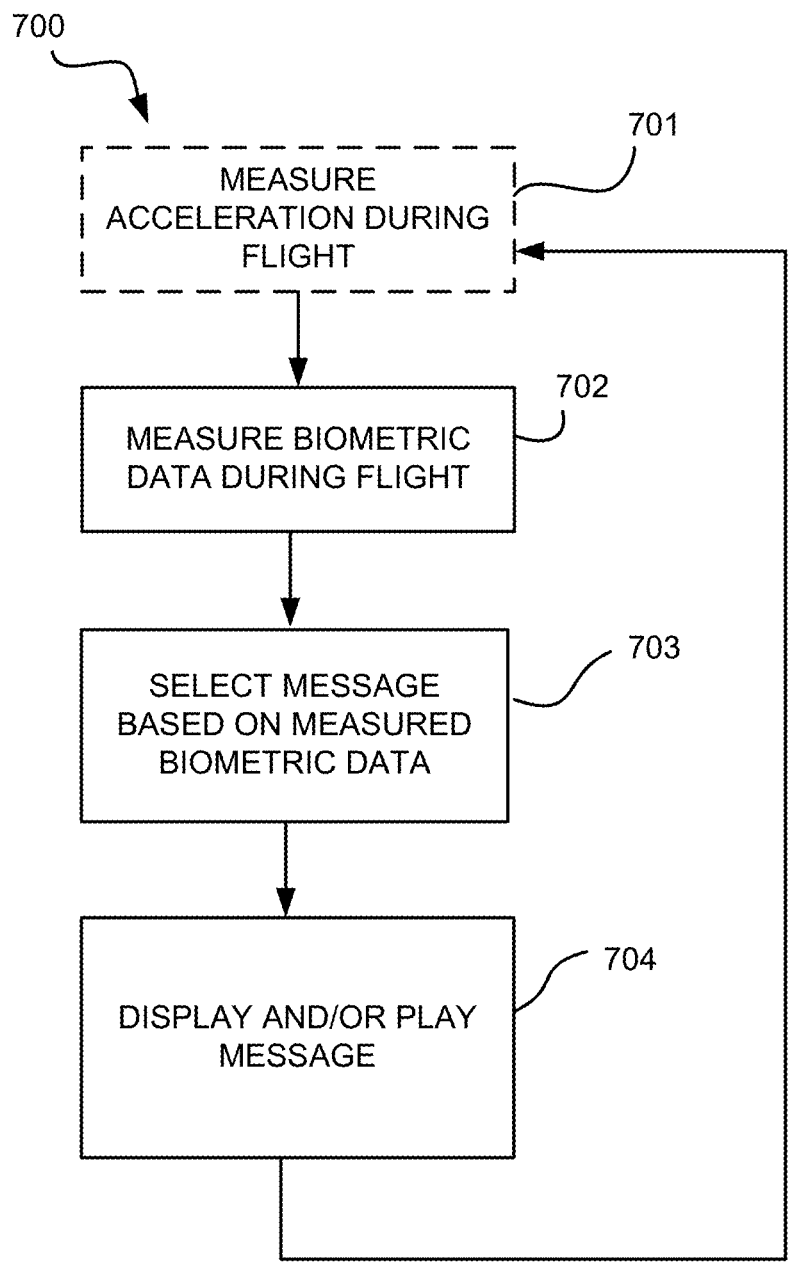

FIG. 7 is a flowchart of an example method 700 provided in accordance with the present invention. The method 700 is similar to the method 600 of FIG. 6, but may or may not measure acceleration data during a flight (Block 701). Biometric information regarding a passenger is monitored (Block 702) and a message and/or other content is selected based on the monitored biometric information (Block 703). The selected message and/or other content is displayed/played (Block 704). As with any of the above methods, the method 700 may be repeated for any desired duration.

In some embodiments, acceleration data may be communicated between multiple portable electronic devices on the plane 100, and/or a composite map of acceleration versus seat position may be determined. Seat position, for example, may be stored in each portable electronic device. Likewise, acceleration data may be collected from multiple flights, and maps of observed turbulence over particular routes, during certain times of day, during certain times of year, during cloudy and/or storming weather, for a specific airline, etc., may be compiled. Such data may be used to create threshold acceleration values for passengers and/or aircraft (e.g., such as those used to adjust content presented to a passenger during a flight). Similar maps and/or threshold values may be developed based on biometric information collected from one or more portable electronic devices.

In one or more embodiments, a web server may collect acceleration and/or biometric data from flights and generate turbulence maps and/or maps of stress levels during flights. In at least one embodiment, prizes may be rewarded for people who experience the greatest turbulence and/or stress during any given flight. In some embodiments, airlines may use the data to compensate the passengers who experience more than a threshold amount of turbulence. Further, third parties such as doctors, counselors, marketing firms or the like may be provided with acceleration and/or biometric data. Likewise, acceleration and/or biometric information associated with passengers may be provided to a flight crew (e.g., allowing the flight crew to monitor passenger stress level or passenger information). In some embodiments, biometric data of flight crew or other passengers may be displayed and/or used as "threshold" values for passengers (e.g., the flight crew isn't worried so you shouldn't be either).

In some embodiments, acceleration data or other flight data collected during a flight may be used to affect video game play on a portable electronic device such as a portable video game player, cellular telephone, tablet computer, laptop computer or the like. For example, turbulence experienced by a plane may be mimicked in a virtual (game) environment, increase or decrease video game character life, energy, speed, etc., cause environmental changes in the video game such as by causing clouds, tornadoes, rain, or the like to form in the video game, cause objects in the game to bounce or vibrate, etc. In the same or other embodiments, biometric data from a passenger may be used to affect video game play and/or environment. For instance, a video game may be configured so as to allow better or enhanced game play if a passenger remains calm (as determined by biometric information measured for the passenger).

In some embodiments, trends in acceleration data or biometric data may be employed to adjust information provided to a passenger. Biometric information and/or acceleration information may be provided to a social network site.

Computer program code may be developed to execute one or more of the methods described above, and such computer code may take the form of an application executable on a mobile device such as a smartphone, tablet computer or the like.

Figure 8:
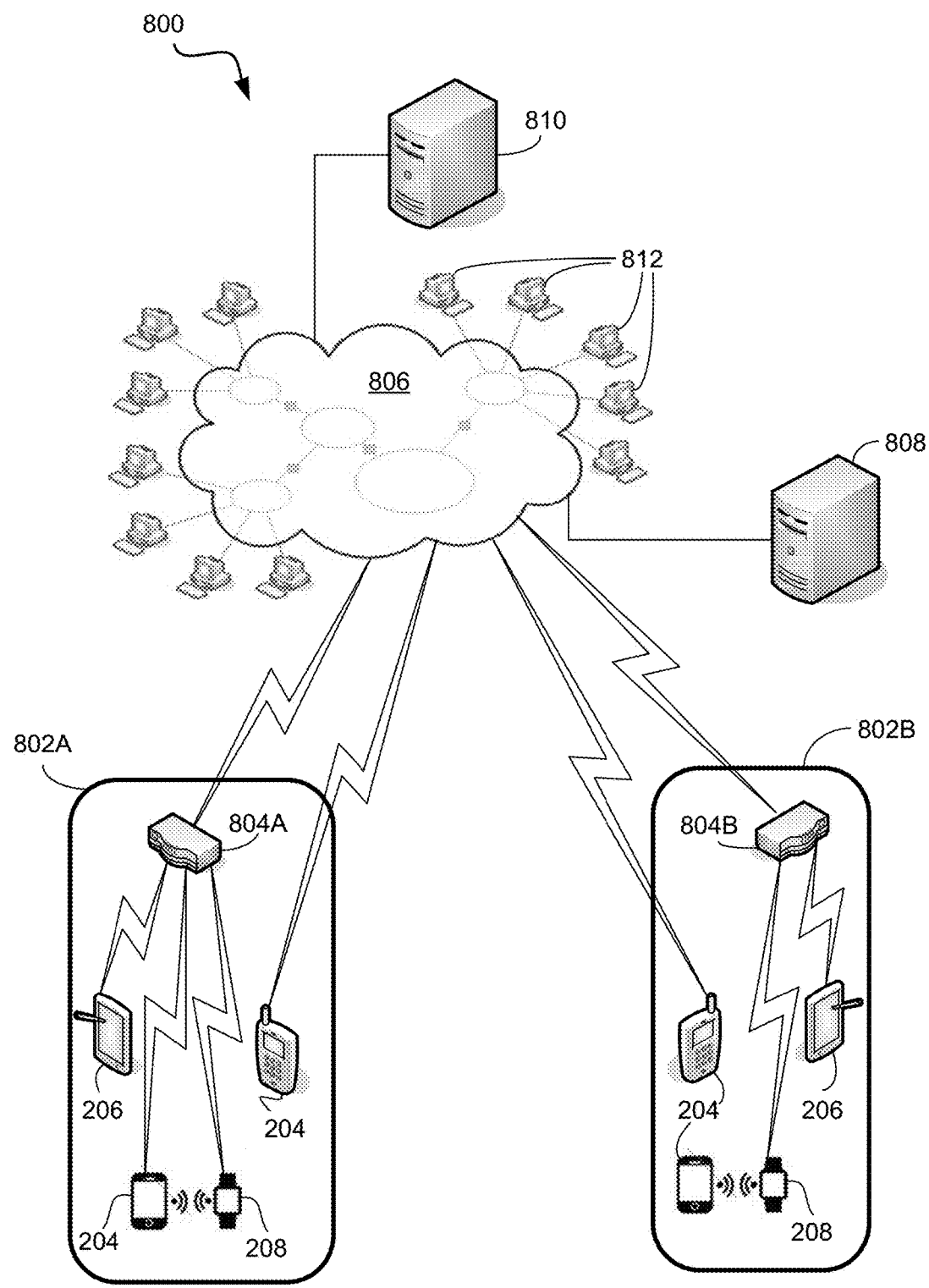
FIG. 8 depicts a schematic drawing of an example system according to embodiments of the present invention.

Turning to FIG. 8, a schematic drawing of an example system 800 according to embodiments of the present invention is provided. The system 800 includes a plurality of vehicles 802A, 802B (only two show) (e.g., aircraft) that each include a communication facility 804A, 804B (e.g., a wireless WiFi router and modem) that enables communication of travel and acceleration information between electronic devices (e.g., a cellular telephone 204, a tablet computer 206, smart wristwatch 208, etc.) and the Internet 806. In some embodiments, the electronic devices may connect to the Internet 806 directly, themselves. The system 800 may further include one or more servers 808, 810 (only two show) that include program code adapted to collect, aggregate, correlate, and/or authenticate travel and acceleration information received from the electronic devices 204, 206, 208. Likewise, the servers 808, 810 may include program code adapted to provide the aggregated, correlated, and/or authenticated travel and acceleration information to user computers 812 and/or the electronic devices 204, 206, 208 via the Internet 806. Thus, for example, the servers 808, 810 may include a web server that collects acceleration information from many different airline flights and provides users information about which airlines experience the least turbulence. Further, the web servers may include code to determine which pilots are able to avoid turbulence more than other pilots. Likewise, the web servers may provide ratings of pilots, aircraft, airlines, etc. that rank the smoothness of the corresponding flights (including landings) and predict the likelihood of a smooth future flight. In some embodiments, weather conditions and route information may be factored into the rankings. The web servers may be adapted to push notification information regarding the rankings and/or predictions to users as information about an upcoming flight becomes available (e.g., when a pilot and plane are assigned to fly a particular trip, based on available weather and/or turbulence maps, etc.).

In some embodiments, the electronic devices 204, 206, 208 may use GPS or other information to determine the direction of travel of the vehicle. Thus, instead of having to orient the electronic device 204, 206, 208, the acceleration information may be determined automatically and even if the electronic device is moved to a different orientation. Likewise, the electronic device 204, 206, 208 may be programmed to automatically distinguish between actual turbulence experienced by the vehicle and simple motion of the electronic device 204, 206, 208. This may be achieved for example, by correlating acceleration information between multiple devices 204, 206, 208 on the same flight or within a certain predefined proximity. Other methods may be used.

Flight information may be received from the web servers or other sources such as third parties or airline carriers. The travel or flight information may include information about the pilots, routes, schedule, weather conditions, cost, the aircraft (including acceleration tolerances), number of passengers, the number of electronic devices 204, 206, 208 monitoring the flight, the speed, direction, altitude, etc., of the flight, and the like. Graphical representations of statistics indicative of the smoothness of a flight may be generated from historical collections of travel and acceleration information.

In some embodiments, the web servers may include code to enable passengers to communication travel and acceleration information with other passengers on the same or different flights. For example, the web servers may track and record individual passenger's travel and acceleration information and create "personal worst" summaries of the passenger's strongest turbulence experienced for comparison to other passengers.

Further, the web servers may include code that generates real time and historical turbulence maps that may be communicated to passengers. Thus, for example, passengers may receive push notification in real time that a geographic area that their flight is approaching includes turbulence measured by other users/passengers' electronic devices that are currently passing, or have recently passed, through the geographic area. In some embodiments, information indicating the passenger's aircraft may easily tolerate the turbulence experienced by the earlier plane may also be provided on the electronic devices 204, 206, 208 based on a comparison of the respective plane's construction specifications.

The electronic devices may also function in a passive mode to collect travel and acceleration information and provide this information to the web servers at a later point in time, e.g., when the electronic device 204, 206, 208 is connected to a computer or coupled to a home network. Thus, the electronic device 204, 206, 208 may function as a "black box" that records travel and acceleration information for later review. In some embodiments, such electronic devices 204, 206, 208 may be used to later determine details about events leading to catastrophic events such as a crash. Further, the electronic devices 204, 206, 208 may include code that transmits a distress signal or beacon if a magnitude of acceleration (significantly) beyond the tolerance of the aircraft is detected. For example, if multiple electronic devices 204, 206, 208 on the same flight determine that an aircraft has suffered a force strong enough to seriously damage the aircraft, the electronic devices 204, 206, 208 may be adapted to report the incident and location information to transportation authorities or rescue personnel.

One or more of the methods described herein may be implemented in computer program code, such as part of an application executable on a portable electronic device, as one or more computer program products. Other systems, methods, computer program products and data structures also may be provided. Each computer program product described herein may be carried by a non-transitory medium readable by a computer (e.g., a floppy disc, a compact disc, a DVD, a hard drive, a random access memory, etc.).

Accordingly, while the present invention has been disclosed in connection with example embodiments thereof, it should be understood that other embodiments may fall within the spirit and scope of the invention, as defined by the following claims.

The invention claimed is:

1. A system comprising:
   a portable electronic device;
   one or more accelerometers, the one or more accelerometers configured to generate acceleration data based on a flight of an airplane, the acceleration data being indicative of acceleration along a first axis, a second axis, and a third axis; and
   computer program code stored in the portable electronic device that, when executed by the portable electronic device, causes the portable electronic device to:
   monitor the acceleration data generated by the one or more accelerometers during the flight of the airplane; and
   display a representation of the acceleration data generated by the one or more accelerometers in relation to a maximum safe acceleration of the airplane;
   wherein the first axis, the second axis, and the third axis are each orthogonal to the other two axes, and the maximum safe acceleration is an acceleration beyond which damage to the airplane in flight is expected, and
   wherein the one or more accelerometers are disposed within the portable electronic device, and the computer program code stored in the portable electronic device, when executed by the portable electronic device, further causes the portable electronic device to monitor acceleration of the airplane responsive to the acceleration data generated by the one or more accelerometers during the flight of the airplane.

2. The system of claim 1, further comprising:
   a sensor disposed external to the portable electronic device,
   wherein the one or more accelerometers are disposed in the sensor, and wherein the computer program code stored in the portable electronic device, when executed by the portable electronic device, further causes the portable electronic device to monitor acceleration of the airplane responsive to receiving acceleration data from the sensor.

3. The system of claim 2, wherein the sensor is disposed in a smart wristwatch.

4. The system of claim 2, wherein the sensor is a wearable sensor.

5. The system of claim 1, wherein the computer program code stored in the portable electronic device, when executed by the portable electronic device, further causes the portable electronic device to correlate the acceleration data with a corresponding location of the airplane.

6. The system of claim 1, wherein the computer program code stored in the portable electronic device, when executed by the portable electronic device, further causes the portable electronic device to provide a video game on the portable electric device, and to employ the acceleration data to affect the video game.

7. The system of claim 1, wherein the computer program code stored in the portable electronic device, when executed by the portable electronic device, further causes the portable electronic device to monitor biometric information of a user of the portable electronic device, and to select content provided to the user based on a combination of the acceleration data and the biometric information.

8. An apparatus, comprising:
   a portable electronic device;
   one or more accelerometers disposed in the portable electronic device, the one or more accelerometers configured to generate acceleration data based on a flight of an aircraft, the acceleration data representative of a magnitude of instantaneous acceleration; and
   a display screen coupled to the portable electronic device,
   wherein the portable electronic device is configured to correlate instantaneous magnitudes of acceleration experienced over time by the aircraft carrying the portable electronic device based on the acceleration data generated by the one or more accelerometers during the flight of the aircraft,
   wherein the portable electronic device is further configured to display, on the display screen, a representation of the instantaneous magnitudes of acceleration over time in relation to a threshold acceleration tolerance level of the aircraft;
   wherein an acceleration of the aircraft greater than the threshold acceleration tolerance level of the aircraft can damage the aircraft in flight; and
   wherein the portable electronic device is configured to monitor acceleration of the aircraft responsive to the acceleration data generated by the one or more accelerometers during the flight of the aircraft.

9. The apparatus of claim 8, wherein the portable electronic device is further configured to correlate the instantaneous magnitudes of acceleration with corresponding locations of the aircraft.

10. The apparatus of claim 8, wherein the portable electronic device is further configured to provide a video game on the portable electronic device, and employ the acceleration data to affect the video game.

11. The apparatus of claim 8, wherein the portable electronic device is further configured to monitor biometric information of a user of the portable electronic device, and select content provided to the user based on a combination of the acceleration data and the biometric information.

12. A method of reducing anxiety during a flight, comprising:
   providing a portable electronic device having computer program code stored therein that, when executed by the portable electronic device, causes the portable electronic device to:
   monitor acceleration data during the flight of an airplane; and
   display a representation of the acceleration data in relation to a threshold acceleration tolerance level of the airplane;
   operating one or more accelerometers during the flight of the airplane, such that the one or more accelerometers generate the acceleration data;
   monitoring, by the portable electronic device, the acceleration data during the flight of the airplane; and displaying, by the portable electronic device, the representation of the acceleration data in relation to the threshold acceleration tolerance level of the airplane,
wherein an acceleration of the airplane greater than the threshold acceleration tolerance level of the airplane can damage the airplane in flight, and
wherein the one or more accelerometers are disposed within the portable electronic device, and the computer program code stored in the portable electronic device, when executed by the portable electronic device, further causes the portable electronic device to monitor acceleration of the airplane responsive to the acceleration data generated by the one or more accelerometers during the flight of the airplane.

13. The method of claim 12, further comprising:
wirelessly receiving, by the portable electronic device, acceleration data from a sensor disposed external to the portable electronic device.

14. The method of claim 13, wherein the sensor is disposed in a smart wristwatch.

15. The method of claim 13, wherein the sensor is a wearable sensor.

16. The method of claim 12, further comprising:
correlating the acceleration data with corresponding locations of the airplane.

17. The method of claim 12, further comprising:
providing a video game on the portable electronic device; and
employing the acceleration data to affect the video game.

18. The method of claim 12, further comprising:
monitoring biometric information of a user of the portable electronic device; and
selecting content provided to the user based on a combination of the acceleration data and the biometric information.

* * * * *